INVENTOR
Elwood P. Wenzelberger
BY
Taubmin & Taubmin
ATTORNEYS

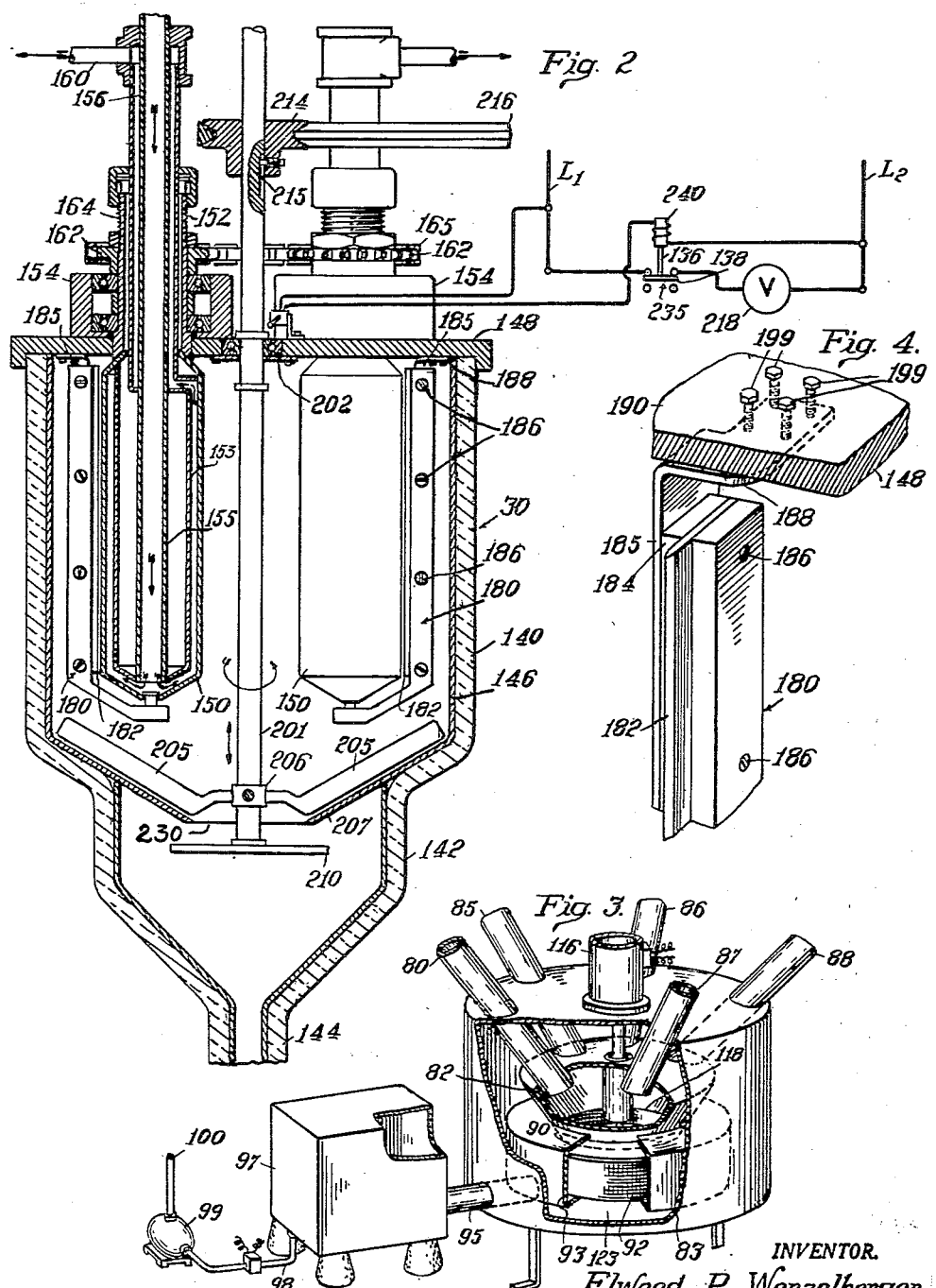

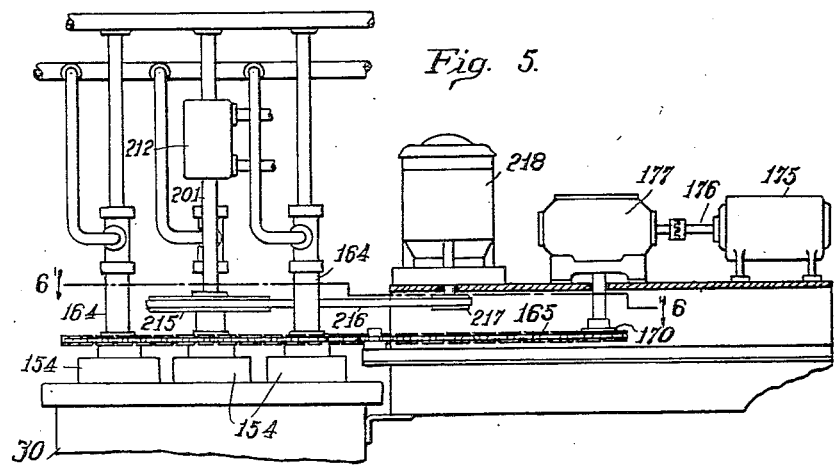
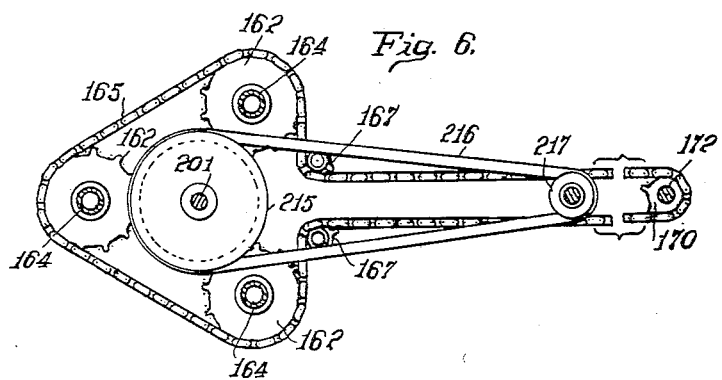

United States Patent Office 2,800,001
Patented July 23, 1957

2,800,001

APPARATUS FOR DEHYDRATING HEAT SENSITIVE MATERIALS FROM LIQUIDS

Elwood P. Wenzelberger, Dayton, Ohio, assignor to The Commonwealth Engineering Company of Ohio, Dayton, Ohio, a corporation of Ohio Original application September 14, 1953, Serial No. 380,071. Divided and this application August 4, 1954, Serial No. 447,701

10 Claims. (Cl. 62—124)

This invention relates to a method and apparatus for dehydration by freezing of solutions and suspensions, particularly those that are heat sensitive. The invention is especially useful in freezing out water as pure ice, utilizing low temperature differentials.

It is an object of the invention to provide a rapid and economical method and apparatus for removing water in the form of ice from water liquids, for example, fruit juices, beer, wines, pharmaceuticals, antibiotics, resins, coffee, milk, vegetable juices, etc., especially water containing liquids which are heat sensitive.

It is another object of the invention to provide apparatus and method for progressively freezing a juice, such as fruit juice, by changing the initial freezing results in the formation of fine crystals of water which can be readily separated from the juice. The resultant juice concentrate then is delivered substantially free of ice crystals, or contain but a small amount of crystals for seeding purposes, to the next successive freezing station wherein the juice concentrate is subjected to a second and slightly lower temperature differential, and the ice crystals formed removed and the resultant concentrate treated to another freezing temperature differential to produce a final concentrate in which substantially all the water has been removed without the loss or removal of other constituents, for example, volatile oils, flavoring substances, vitamins and other elements which produce the characteristic flavor and palatable characteristics of the juice. The process of the invention avoids the use of heat, vacuum, pressure, adjuvants, etc. which alter or change the original characteristic properties of the juice and produce a concentrated juice having the original flavor and palatable characteristics of the ripe fruit.

It is another object to provide freezing tanks which are equipped with a combined plate valve and distributor disc. This combined valve and distributor disc is arranged to be operated by a piston or prime mover arranged on top of the tank. When the piston is up the plate valve at the bottom of the tank is drawn up closing the discharge opening in the bottom of the tank. On the other hand, when the piston is moved downwardly the valve is moved away from its seat, opening the tank for discharge of the refrigerated mixture. The plate valve is mounted on the lower end of a rotatable shaft which is arranged to be continuously rotated when the plate valve is in its lower and open position. This is accomplished by employing a flexible belt drive operated by an electrical motor, the circuit to which is closed when the piston is operated to remove the plate valve to its open or downward position.

A further feature of this invention comprises the novel construction of the freezing cylinder. Each of the freezing cylinders comprise an internal stationary cylinder and an outward concentric cylinder which is revolved about the inner cylinder. A scraper, or blade member, is arranged about the outer revolvable cylinder and is maintained in close association with the surface of the revolving cylinder to prevent the formation of ice and the caking of the same on the surface of the revolving freezing cylinder. The scraper blade is rigidly mounted at the top on the underside of the cover or cap plate of the tank and at its extremity is rotatably secured at the bottom of the freezing cylinder. The freezing cylinder thus revolves in substantial contact with the scraper blade whereby ice crystals are prevented from agglomerating and caking on the surface of the freezing cylinder.

The internal cylinder, which remains stationary, contains a central supply pipe for admitting refrigerant to the freezing cylinder and extends downward and terminates adjacent the bottom of the cylinder so that refrigerant is conducted down through the central supply pipe as discharged upwardly between the outer wall of the stationary cylinder and the inner surface of the outer revolving cylinder walls.

A master stirrer consists of radially extending arms which are inclined upwardly so as to conform with the sloping bottom wall of the tank. The stirrer arm performs the dual function of giving rotary movement to the ice and slushy mixture of juice or fluid being refrigerated and causes the same to move vertically and spirally about the freezing cylinders so as to maintain the mixture in continuous agitation while being subjected to the freezing treatment.

Another structural feature comprises the arrangement of the freezing tanks in a circle about the centrifuge or ice separator which is located below and centrally of the five tanks. Ducts interconnect the tanks with a hopper or receiver disposed around the centrifuge shaft, and a sleeve is mounted in spaced relationship within the hopper and disposed about the shaft for driving the centrifuge and against which the incoming ice and slushy juice mixture is discharged. This improved arrangement causes the mixture to flow downward through the bottom of the hopper on to the distributor disc or plate arranged within the centrifuge and which disc is rotated to evenly distribute the mixture in the central perforated basket of the centrifuge. At the bottom of the centrifuge a discharge opening is provided for discharging the ice upon a conveyor from whence the ice is conveyed to a melting tank arranged to chill the incoming juice. The juice is substantially free of ice crystals and is thrown out against the inside wall of the centrifuge from whence it flows into a sump tank or receiver from which it is pumped to successive tanks for further refrigeration and dehydration or is drawn off for packaging for shipment or storage.

It is a further object to provide a common header for receipt of the juice and ice from the several stages and a common centrifuge.

It is an additional object to return the juice from the first stage to the second stage and from the second stage to the third stage in ice-free condition.

It is an additional object to utilize the ice and ice water for reduction of the refrigeration load and for use in the initial pre-cooling of the raw juice supply.

It is the object of this invention to provide a controlled series of decreasing temperatures on each container for each batch of dehydrated juice; to utilize the ice in one container, to partially reseed the dehydrated juice in the next container and to selectively remove the juice from each container independently of the other containers and remove the ice from the juice to the next container ice-free or substantially ice-free and ultimately to remove the finally dehydrated juice for packing.

It is my particular object to provide a continuous system which can be automatically controlled for the foregoing purposes so that no manual attention is needed except to a minor degree.

It is a further object to provide for rapid dehydration through rapid crystal formation by having the large crystal aggregates broken up by agitation into small crystals. It is to be understood that, if white ice forms, it is exceedingly difficult to remove and has a tendency to clog and plug the mechanism and causes great difficulty in entrainment of juices and solids.

It has also been found that these crystals, formed in suspension, yield a more concentrated solution, which, in turn, has a lower ice forming temperature. This process can be continued until the solution will freeze as a homogeneous mass and no more ice separates. This process is normally stopped short of this stage.

It is still another object of the invention to provide a freezing tank for carrying out each differential freezing step, the tanks each being equipped with a combined plate valve and a distributor plate or disc which is operated by a piston whereby the removal of ice crystals from the concentrate is facilitated at each step of the freezing treatment.

A still further object is to provide an improved freezing tank or unit wherein the formation of ice cakes on the surface of the freezing cylinder is prevented whereby the ice crystals are substantially inhibited from growing into large crystals and are maintained as fine, granular particles distributed through the liquor or juice being treated.

Still a further improvement in the apparatus resides in the provision of a stirrer for each of the freezing tank units which performs the dual function for providing rotary agitation to the slush and the juice while, at the same time, by a downward movement of the stirrer shaft accomplishing the quick opening and discharge of the ice and slush from the freezing tank. The juice is thus subjected to continuous and uniform agitation during treatment. At the end of each refrigeration stage the ice particles are removed and conveyed to a melting tank through which the incoming juice or solution being treated is passed so as to chill the same to the desired temperature prior to subjecting it to a plurality of temperature differentials to freeze out the water as fine, clear crystals substantially free from occluded solids or juices.

The improved apparatus and method makes it possible to treat fruit juices and the like so as to produce a concentrate having high degree Brix and which eliminates the need for fortifying the concentrate with an addition of raw juice, as has been the practice heretofore. In commercial practice where vacuum or heat treatment of fruit juices, such as orange juice, is employed, it has been common practice to add back to the concentrated juice, after dehydration, about 20 to 25% by volume of concentrated juice. This has been found necessary to mask the deterioration brought about by the loss of volatile flavoring ingredients of the natural fruit juice.

By utilizing the apparatus and method of the present invention, the removal of water from fruit juices may be carried out to a high degree without injury to the juice or changing its natural flavor and palatable characteristics. The juice is concentrated by the removal of water as fine, clear ice crystals without the application of heat, vacuum or the addition of adjuvants so that the true flavor and the natural elements of the juices are preserved. This has been found to be impossible to accomplish with such heat sensitive substances where the same is subjected to even small degrees of heat treatment or vacuum distillation.

In the freezing of ice under normal conditions, the heat transfer is effected by imposing a large temperature differential between the coolant and the water. The quantity of heat transferred per square foot of heat transfer surface under such conditions is large and the sole factors to be considered are temperature of water, the quantity of water, and the temperature of the coolant.

Freezing of pure ice from solutions containing dissolved material such as salts and sugars and solid matter such as pulp fibers presents an entirely different problem.

By pure ice is meant crystal ice substantially free of occluded solution and/or solids. Pure ice may be distinguished readily from white ice because of the definitely fine crystal formation, presenting a mass of individual crystals in unagglomerated form.

It has been discovered that pure ice can only be frozen from fruit juice solutions and other heat sensitive compositions when the temperature differential between the solution and the coolant is of the order of 5 to 7° F.

This results in a concentration from which nothing has been removed except the water and the water removal has been effected without detriment to vitamins, volatile oils, taste, and other characteristics of the product, as aforementioned.

These and other objects and advantages will become apparent from the following description taken in connection with the drawings wherein:

Figure 2 is an enlarged detail view partly in section showing the internal arrangement and construction of a freezing unit or tank of the assembly illustrated in Figure 1;

Figure 3 is a diagrammatic view in perspective of the centrifuge and associated mechanism for separating ice and liquid from the freezing tanks and taken substantially on the line 3—3 of Figure 1 looking in the direction of the arrows, certain parts being broken away;

Figure 4 is a fragmentary detail view in perspective illustrating the construction and mounting of the scraper for preventing ice formation on the freezing cylinders;

Figure 5 is a detail fragmenatry elevational view illustrating the power driving means and associated piston-cylinder mechanism for operating the combined stirrer and plate valve for the freezing tanks, and;

Figure 6 is a plane view of the sprocket and drive chain for rotating the cylinders in each of the freezing tanks, and associated mechanism for operating the stirrer, the view being taken on the line 6—6 of Figure 5.

Figure 1:
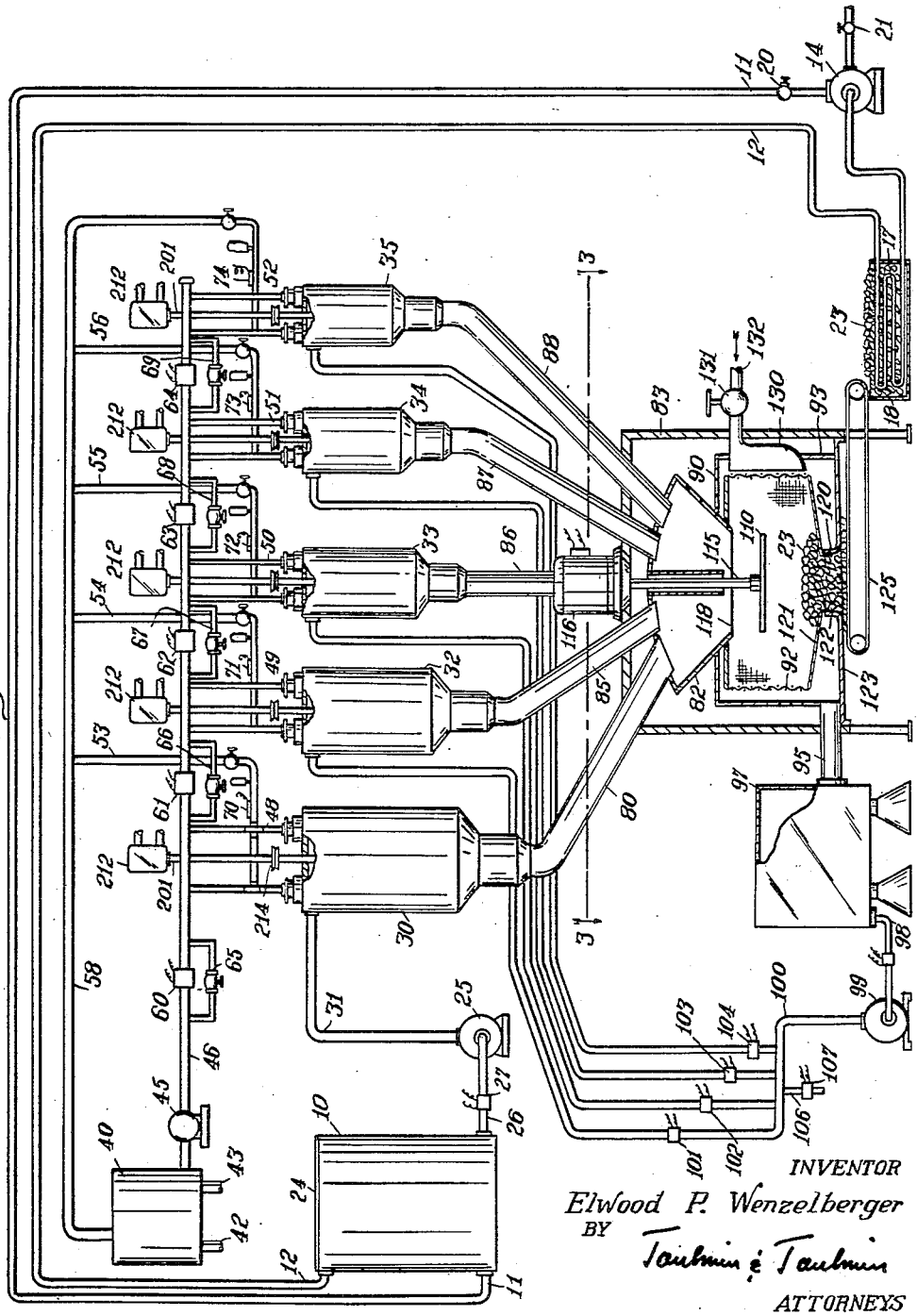
Figure 1 is a diagrammatic view of one embodiment of the progressive dehydration process and apparatus, certain parts being shown in section in the interest of clarity.

The process of the invention is based on the principle of forming pure ice crystals by immediately removing the same except for seeding the nucleii and repeating the process at a lower temperature differential until substantially all of the water has been removed as pure ice crystals.

Briefly, the process of this invention comprises lowering the temperature of a liquid composition below the solidification temperature of the solvent therein, continuously supplying ice crystal nucleii to said composition by continuous separation of initiated ice crystals from the heat transfer surface, agitating the composition to control the ice crystal size and growth, and removing the ice crystals, leaving the resultant liquid concentrate at least partially dehydrated.

The crystal nucleii are distributed to grow in the composition under agitating conditions controlling the crystal size, thus avoiding formation of white ice which occludes solids, freezes to large agglomerates and prevents clean separation of ice and liquid.

In this freezing operation, there is a limited quantity of water which is convertible to solid ice at a temperature imposed upon any identical freezing step. This quantity of water or freezing potential is that amount which must be removed to produce a composition having a freezing point which is equal to the imposed temperature.

Elimination of this water as ice crystals comes about through growth of ice crystal nucleii to ice crystals separable from the liquid composition by means of, for example, a centrifuge.

Since white ice results from growth of crystals to too great a size, the control of crystallization is a vital factor. The greater the number of ice crystals growing in the composition, the quicker the dissipation of freezing potential and the smaller will be the average size ice crystals.

The instant invention by removing ice from the cooling surface as it is formed distributes throughout the freezing composition a large number of ice crystal nucleii which grow as long as there is solidifying potential.

Ice formation being continuous at the cooling surface, a continuous stream of ice crystal nucleii are being formed and being separated from the surface for distribution in the composition.

The result is a continuously multiplying number of growing crystals which are so numerous that, under the conditions of agitation, none grow large enough to alter their character from crystal ice to white ice.

When there is a relatively small differential between the initial ice forming point of water of the solution and the temperature maintained in the container by the refrigerating medium, the transformation of water to ice takes place within a time interval, within which interval the ice forming point of the solution is lowered to approximately the temperature imposed upon the solution in the container and ice formation ceases, the time intervals being determined by the rate of heat transfer to the refrigerating medium.

The heat transfer, it has been found, can be effected while maintaining small temperature differentials, if a ratio of one square foot of refrigerating surface for each one to one and a half gallons or less of liquid is maintained.

When such ratios are held substantially constant, the time period, for example, 12 to 20 minutes, remains substantially constant regardless of the quantity of liquid being processed.

To be commercially feasible the process must have a high volume capacity. In this system the capacity is great because the time interval for maximum ice formation is under direct control at all times and the series of containers integrated in their operation, so that liquid only stays in each tank long enough for formation of the maximum ice content or ice crystals of maximum size for that temperature, and as a consequence thereof reaches the maximum concentration for that stage before the resultant solution is moved to the next container, whose temperature is lower than the temperature at which ice again will form in the solution. The result of this repetitive operation is to produce gradual but uniform crystal growth.

If this uniform heat transfer were to be accomplished without any agitation, large crystals would form. The type of agitation I use creates small crystals and serves two other functions.

A wiping blade agitator removes any ice which otherwise would cling to the heat exchange surfaces of the vessel. This is removed as fast as it forms. This ice immediately acts as a seeding process to grow more crystals throughout the volume of the liquid. This wiping agitation is performed by a relatively slow speed agitator of about 125 R. P. M.

The other agitator (at higher speed, i. e., about 800 to 900 R. P. M.) prevents large crystal growth, producing small pure ice crystals. It also prevents the crystals so formed from floating to the top of the liquid where they would aggregate and coalesce together to form a solid mass of ice which would occlude juice.

By forming large numbers of individual small crystals, continually in motion in the liquid, they remain unattached to each other with a uniform dispersion of ice crystals in the liquid medium. Being a liquid with ice slush it becomes easy to transport it or flow it through pipes from one piece of apparatus to another.

The tabulation given later is suggestive of the ratio of temperatures. It has been found that these temperatures, while typical, represent a rule of action that secures the desired result.

The maintenance of temperatures, which are continually being lowered, maintains the ice as individual crystals, solid in form and easily centrifuged.

This is in marked distinction to the results obtained where the ice is warmed for partial melting or where white ice is formed having juice and solids occluded therein, and the ice takes on a physical character which will disrupt the process.

It has been found that by first cooling a liquid bearing solids and adjusting the difference between the temperature of the liquid and the temperature of the refrigerant by a small differential of approximately 5 to 7 degrees, and then agitating by means of both agitating units the liquid bearing solids or dissolved material or both, the liquid will immediately form ice very rapidly.

Continuous agitation prevents localized cooling and ice formation at the normal congealing point, particularly in large crystals and in white ice.

This operational method secures the result of fine crystals in a large mass without occluding some of the solution or solids in the ice.

In order to obtain these fine crystals in a relatively pure form without solids, the temperature of the cooling liquid in each successive freezing step must be held practically at a constant temperature, the temperature being maintained at a predetermined lower temperature, below the ice forming temperature of the solution.

In order to speed the ice crystal formation under these conditions, the system must possess high seat exchange capacity. This may be brought about by first, agitation, which brings about rapid change of the liquid interface on contact with the freeze surfaces, secondly, by maintaining a ratio of one square foot of cooling surface for each one to one and a half gallon of solution being treated, and, thirdly, by maintaining the flow of refrigerant capable of removing a relatively large quantity of heat.

It has been found to be important that the major portion in many instances of the stages of progressively lowering the temperature shall be above zero, and it is also found important that the successive stages be at relatively small temperature reductions, such as about 5° and 7° F., and that the temperature of the liquid in the second stage should be approximately the temperature of the refrigerant in the first stage and so on. It will be understood that these differentials will vary with the liquids and the solids, but the principle of the operation remains the same.

By avoiding extremes of temperature, quick freezing and by maintaining easy stages of lowering temperatures and modest differentials between the refrigerant and the liquid while causing agitation, a steady freezing or small ice crystals will take place and rapid dehydration can be effected without occluding other liquids and solids than water.

By starting, as in the case of orange juice, at a tank temperature of 23° F. above zero, with an outside temperature of 18° F. then a temperature in the next tank of 18° F., with an outside temperature of 13° F., then a tank temperature of 13° F. with an outside temperature of 8° F. and in the fourth tank, a temperature of 8° F. with an outside temperature of 3° F., and in the last tank a temperature of 3° F. with an outside temperature of −2° F., free clear ice crystals can be secured that are easily maintained by the stirrer, in free movement, with minimum crystal size and the maximum freezing capacity for the temperature applied. This principle of a multiple series of steps, starting the temperature just about at the freezing point of the juice and progressively reducing it and progressively removing water by freezing, enables this result to be secured.

The apparatus capable of carrying out the process of this invention comprises a chamber provided with inlet and outlet passages and a multiplicity of cylinders, each cylinder being provided with inlets and outlets for refrigerating medium.

Each cylinder or freezing unit comprises a circular shell and at least one freezing surface scraper, the shell and scrapers being adapted for movement relative to each other about a common axis.

The chamber is preferably circular if more than four freezing cylinders are to be installed therein. For four freezing cylinders a square chamber gives the best volume distribution.

It also has been discovered that for tanks of this character having a ratio of gallons of liquid per unit of surfaces area of approximately 1.4 to 2 gallons per square foot, freezing of pure ice will occur at a 5° F. differential at any capacity in the above range for which heat transfer capacity is available in the refrigeration circulating unit. Tanks preferably are constructed having a ratio of gallons of liquid per unit of surface area in the range of approximately 1.5 gallons per square foot.

Referring to the drawings, particularly Figure 1, numeral 10 designates a supply tank for raw juice, such as orange juice, to be treated. The raw juice in tank 10 is maintained at a temperature of about 23° F. by the circulation of ice water or brine previously cooled by the ice flowing through the outer jacket of tank 10 and supplied to the pipe line 11 and discharged therefrom through the pipe 12. The refrigerant is circulated about the tank 10 by the pump 14, the refrigerant passing through the coil 17 arranged in the tank 18. The valve 20 is disposed in the pipe line 11 which is closed when the system is to be drained through valve 21. Ice water for cooling the refrigerant is supplied from the melting ice 23 in tank 18. The tank 10 is closed by a cover or top portion 24 and, where desired, air may be eliminated from the tank 10 and other suitable steps taken to prevent contamination of the juice and inhibit bacteriological and enzymatic action.

The tank 10 is connected to the inlet side of the pump 25 through the pipe line 26. The passage of juice therethrough is controlled by an electrically operated valve 27.

Pump 25, upon operation of valve 27, delivers raw juice to the first refrigeration tank 30 through pipe line 31. A second tank of progressively smaller capacity is employed for each of the subsequent refrigeration stages. In the embodiment illustrated in Figure 1, five such refrigerating tanks are employed, namely, 30, 32, 33, 34 and 35. The valve 27 is preferably set to open when the temperature of the juice is about 23° F. and the same is pumped into tank 30 which comprises a plurality of freezing chambers or units which are arranged at a constant freezing temperature by a refrigerant circulated therethrough.

The refrigeration tanks 30, 32, 33, 34 and 35 are of like construction and operation. The refrigeration system for the tanks is conventional and includes a source of brine, or the like refrigerant, which is supplied to the tank 40, the same being cooled by refrigerant supplied to the coil arranged in the tank and connected thereto through pipes 42 and 43. The brine or refrigerant for the refrigeration tanks is conducted from tank 40 by the pump 45 into the pipe line 46 and thence to the successive refrigeration tanks 30, 32, 33, 34 and 35 by the pipe lines 48, 49, 50, 51 and 52 respectively, the refrigerant being returned through the discharge lines 53, 54, 55 and 56 respectively and back to the refrigerating tank coil 30 through pipe line 58.

The flow of juice to the several refrigeration tanks is controlled by electrically operated valves 60, 61, 62, 63 and 64 respectively, the valves being provided with by-passing manually operable valve controlled by-passes 65, 66, 67, 68 and 69 respectively.

Thermostats 70, 71, 72, 73 and 74 are arranged in the refrigerant supply lines 53, 54, 55 and 56 and are electrically connected to control the operation of the valves 60, 61, 62, 63 and 64 respectively. The refrigerant for tank 30 is admitted at a temperature of 18° F.; that for tank 32 at 13° F.; tank 33 at 9° F.; tank 34 at 3° F.; and tank 35 at −2° F.

After refrigerating the juice in tank 30 to freeze out a portion of the water as ice crystals, the resultant slushy mass is discharged from the tank through a conduit 80 into a discharge hopper 82 arranged in the centrifuge chamber 83. Similarly, the juice which has been subjected to refrigeration in tanks 32, 33, 34 and 35 is discharged through conduits 85, 86, 87 and 88 respectively, as shown in Figure 1.

The material discharged into the hopper 82 is tarnsferred to the centrifuge 90 which comprises a perforated or screen wall 92 for retaining the ice crystals while throwing out the concentrated juice which is collected in the bottom of the containers 93 from whence it is conducted through the conduit 95 into the receiving tank 97. The treated juice in the receiving tank 97 is drawn off therefrom through pipe line 98 by the pump 99 and discharged through line 100 for returning to the system for further refrigeration and dehydration. The flow of juice through line 100 to the refrigeration tanks 32, 33, 34 and 35 is controlled by electrically operated valves 101, 102, 103 and 104 respectively.

Where it is desired to draw off the concentrated juice from pipe line 100 the connecting discharge line 106 is provided which is controlled by electrically operated drain valve 107.

Material introduced into the hopper 82 is discharged therefrom and distributed evenly in the centrifuge 90 by means of the rotating disc member 110. The distributor disc 110 is fastened to the lower end of the shaft 115 which extends downward through the hopper 82 and is suitably rotated by the motor 116 arranged on top of the chamber 83, the distributor disc 110 being positioned below the discharge opening 118 sufficiently, as shown in Figure 1, to permit the ready flow of frozen juice downwardly through the hopper and on to the rotating distributor plate 110.

The centrifuge 90 is provided with a discharge opening 120 which is located centrally in the bottom sloping wall 121. The opening 120 registers with an opening 122 in the bottom wall 123 in the container 93. Arranged beneath a discharge opening 122 is an endless conveyor 125 which is arranged to receive the ice particles 23 from the centrifuge and transfer the ice to tank 18. To assist in the discharge of the ice particles from the centrifuge an adapter 130 is arranged for discharging air under pressure against the perforated side wall of the centrifuge. A manually operable valve 131 is provided for admitting air, or the like gas, under pressure to the adapter through the conduit 132 which, in turn, communicates with the air compressor or source of fluid supplied. The air as delivered by the adaptor 130 is ordinarily at room temperature (70–72° F.) and such as to cause slight melting of the ice crystals. This further assists in mechanically removing mother liquor or residual juice from the ice particles. The temperature of the air used, of course, may be controlled and raised or lowered as desired.

Referring to Figure 2, the construction and operation of the freezing tanks is illustrated, each of the tanks being similarly constructed, as illustrated in Figure 2.

The construction and operation of refrigerating tank 30 is illustrated wherein the same comprises a cylindrical wall 140 having a depending chamber 142 of reduced diameter with a conical-shaped lower section 143 which is provided with a discharge opening 144. The tank is provided with an inner insulating liner 146 and a cover 148. Disposed in the interior of the tank are refrigeration cylinders 150, three cylinders being employed in the tank illustrated, the same being equally spaced about the center of the tank.

The refrigerating cylinders 150 comprise hollow rotatable containers having an elongated neck portion 152 which is supported for rotation on the journal member 154 arranged on the cover or top 148 of the tank. The refrigerating cylinders comprise an inner stationary cylinder 153 and a central hollow tubular shaft 155 through which refrigerant is conducted downwardly and into the cylinder. Refrigerant flows downward through the tubular member 155 which extends lengthwise of the inner cylinder 153, as indicated by the arrows, and is discharged outwardly and upwardly to the hollow passageway 156 disposed immediately adjacent the outer wall of the cylinder and formed by the spacing between the walls of said inner and outer cylinders. The upper end of the passageway 156 is connected to a discharge pipe 160 for return of the refrigerant. The refrigerant is thus circulated through the cylinder as the same rotates. Rotation of the cylinder is provided by the sprocket 162 threaded on to a neck portion 164 of the cylinder, the sprocket being threaded down on to the journal and bearing unit 154. The sprocket is driven by an endless chain 165 which passes around the sprockets of each refrigeration cylinder 162 and is guided about the idle sprocket 167 and over the sprocket 170 which is keyed to the drive shaft 172. This drive shaft is driven through by the motor 175 which is operatively coupled through the shaft 176 to the change gear box 177 drivingly connected to the shaft 172, as shown in Figures 5 and 6.

Referring to Figure 2, the refrigerating cylinder 150 is provided with a scraper blade member 180 which is suitably shaped to conform with the outer cylindrical wall and sloping bottom portion of the refrigeration cylinder, as illustrated in Figure 2. The scraper blade 180, as shown in Figure 4, comprises a blade 182 which is suitably secured in the block 185 which, in turn, is bolted to the supporting plate 185 by means of the machine bolts 186. The supporting plate 185 comprises a flange portion 188 which is bent at right angles over the top of the blade holder 184 and extends backwardly thereover to provide a flange portion 190 which is secured to the underside of the top wall 148 of the tank by the bolts 199. The scraper is thus fixedly secured on the underside of the top of the tank and the cylinder rotated substantially in contact with the outer surface of the cylinder to thereby prevent the ice crystals from collecting thereon.

For providing agitation and delivery of the refrigerated juice, a stirring mechanism is arranged in each tank. This mechanism comprises a central shaft 201 which extends downwardly through the top of the tank and is suitably journalled, as at 202, in the top wall of the tank. Arranged on the lower end of the shaft 201 is a propeller blade 205 which is secured to the shaft 201 by collar member 206. The propeller blades 205 extend outwardly substantially the length of the sloping wall 207 of the tank and prevent the ice crystals from clinging or jamming up in the bottom of the tank.

The shaft 201 is also provided with a distributor disc 210 which is disposed on the lower extremity of the shaft 201 and spaced at a distance from the collar 206 carrying the blades 205. The shaft 201 of the stirring mechanism is arranged to be rotated as well as reciprocated vertically, as indicated by the arrows, Figure 2. For raising and lowering the shaft 201 of the stirrer there is provided a piston and cylinder means 212 which is arranged for operation by compressed air, or the like fluid, under pressure to raise or lower the propeller stirring shaft 201.

Rotation of the stirring shaft 201 is provided for by means of the pulley 214 keyed to the shaft 201 as at 215. The pulley 214 is suitably driven by a V-belt 216 operatively connected to the driven pulley 217 which is driven by a motor 218, as better shown in Figure 5.

The distributor disc 210 is loosely mounted on the end of the drive shaft 201 whereas the propeller blades 205 for stirring the mixture are keyed to the shaft so that the blades continuously stir the mixture upon rotation of the stirrer shaft 201. In order to quickly discharge the slushy mass from the tank upon reciprocating the shaft 201 downwardly to move the distributor plate or disc 210 away from the discharged opening 230, means is provided for actuating an electrical switch to slow down the speed of the rotating shaft 201. Preferably, the stirrer mechanism is reversed, as by the use of a reversible motor, so that the slushy mass will quickly settle and will be flushed out of the bottom of the tank by the rotating propeller blades 205, the ice crystals falling on to the rotating disc 210 and thrown downwardly in a uniform stream so that the same can flow downwardly through the conduit 144 to the hopper 82 and thence to the centrifuge.

To effect the closing and opening of the switch to the motor 218 through electrical circuit $L_1$ and $L_2$, there is provided a trip switch 235 which is positioned on top of the tank adjacent to the shaft 201. An actuating arm 236 is arranged to be engaged by fixed collar 238 on the shaft 201. When the shaft 201 is raised upwardly the collar 238 engages the switch actuating arm or lever 236 so as to trip the switch 235 and operate the motor 218. In the electrical circuit $L_1$ and $L_2$ is arranged a solenoid operated switch 240 which is employed to maintain the circuit closed during operation of the stirrer but open the circuit upon actuation of the switch 235 to disconnect the motor 218. Where it is desired, additional stirring means may be used together with the combined plate valve and stirrer mechanism of this invention such as shown and described in my copending application, Serial No. 153,806, now Patent No. 2,657,549 and of which the present invention represents novel structural features thereover and method of operation, and is also a division of my copending application Ser. No. 380,071 filed September 14, 1953.

It will be understood that the foregoing description comprehends various changes in the operational temperatures, mechanism, speed of stirring and procedure and that the process and apparatus is not limited to the treatment of citrus juices.

What is claimed is:

1. Apparatus for dehydrating liquid bearing solids by subjecting the same to freezing temperature to remove water as ice crystals, said apparatus comprising the combination of a container for holding the liquid to be treated and a cylinder disposed therein for receiving refrigerant, said cylinder comprising an inner stationary cylinder and outer revolvable cylinder having rigid inflexible walls, said outer cylinder being of slightly greater diameter than said inner cylinder and forming a concentric hollow wall space therebetween through which refrigerant is conducted, and means for revolving said outer cylinder.

2. Apparatus for dehydrating liquid bearing solids by subjecting the same to a series of separate freezing treatments wherein the temperature for each treatment is maintained at a lower differential to transform a portion of the water into ice crystals which are removed, said apparatus comprising a series of tanks for holding the liquid to be treated, a plurality of freezing cylinders in each tank, said freezing cylinders comprising pairs of telescoping hollow cylinders, the same being connected together for receiving refrigerant, stirrer means for agitating the liquid in said tanks, a discharge opening in the bottom of each tank, and means comprising a valve operatively connected to said stirrer for closing said discharge opening, and means for opening and closing said valve during operation of said agitating means.

3. Apparatus for dehydrating liquid bearing solids by subjecting the same to a freezing temperature to remove water as ice crystals, said apparatus comprising the combination of a container for holding the liquid to be treated and a cylinder disposed therein for receiving refrigerant, said cylinder comprising an inner stationary cylinder and outer revolvable cylinder, said outer and inner cylinders forming a hollow wall therebetween through which refrigerant is conducted, and means for revolving said outer cylinders, a discharge opening in said container, and valve means for said opening comprising a rotatable distributor disc for said ice crystals discharged from said container, and means for operating said valve while rotating the same to open and close said discharge opening.

4. In an apparatus for dehydrating citrus juices by freezing out the water as ice crystals, the combination of a container for holding the juice for dehydration and a freezing cylinder disposed therein for receiving refrigerant, said freezing cylinder comprising an inner stationary and an outer revolvable cylinder having rigid inflexible walls, said inner cylinder comprising a double-wall structure with a central opening extending therethrough for the passage of refrigerant, said cylinders forming a hollow concentric space therebetween for receiving said refrigerant, and means for revolving said outer cylinder.

5. In an apparatus of the character described, a container for receiving material to be refrigerated, means comprising a pair of concentrically arranged hollow cylinders defining a passageway therebetween for refrigerant for refrigerating said container to at least partially freeze the contents, a discharge opening in said container for discharging the refrigerated contents therefrom, means comprising a centrifuge for receiving the discharged material, said centrifuge comprising a perforated wall for the discharge of liquid material and an opening in said centrifuge for the discharge of ice crystals, and means for heating said centrifuge, said centrifuge being adapted to discharge liquid and ice crystals continuously and simultaneously.

6. In an apparatus of the character described, a container for receiving material to be refrigerated, means comprising a pair of concentrically arranged hollow cylinders defining a passageway therebetween for refrigerant for refrigerating said container to at least partially freeze the contents, a discharge opening in said container for discharging the refrigerated contents therefrom, means comprising a centrifuge for receiving the discharged material, said centrifuge comprising a perforated side wall for the discharge of liquid material, a separate opening in the bottom portion of said centrifuge for the discharge of ice crystals, means for collecting the liquid discharged from said centrifuge, means for heating said centrifuge, and means for receiving and conveying said ice crystals away from the centrifuge discharge opening.

7. In an apparatus of the character described, a container for receiving material to be refrigerated, means comprising a pair of concentrically arranged hollow cylinders defining a passageway therebetween for refrigerant for refrigerating said container to at least partially freeze the contents, a discharge opening in said container for discharging the refrigerated contents therefrom, a hopper for receiving the material discharged from said container, an opening in said hopper for discharging material therefrom, means comprising a centrifuge for receiving material discharged from said hopper, means comprising a rotatable disc member for distributing said material discharged from said hopper into said centrifuge, said centrifuge comprising a perforated side wall for the discharge of liquid, a separate opening in said centrifuge for the discharge of ice crystals, means for collecting said liquid discharged from said centrifuge, means for delivering warm air to said centrifuge, and means for collecting said ice crystals delivered by said centrifuge.

8. In an apparatus of the character described, a container for receiving material to be refrigerated, means comprising a pair of concentrically arranged hollow cylinders defining a passageway therebetween for refrigerant for refrigerating said container to at least partially freeze the contents, a discharge opening in said container for discharging the refrigerated contents therefrom, a hopper for receiving the material discharged from said container, an opening in said hopper for discharging material therefrom, means comprising a centrifuge for receiving material discharge from said hopper, means comprising a rotatable disc member for distributing said material discharged from said hopper into said centrifuge, said centrifuge comprising a perforated side wall for the discharge of liquid, a separate opening in said centrifuge for the discharge of ice crystals, means for collecting said liquid discharged from said centrifuge, means for collecting said ice crystals delivered by said centrifuge, and means for introducing a heated gas under pressure through said perforated wall of the centrifuge and into contact with the material therein.

9. In an apparatus of the character described, a container for receiving material to be refrigerated, means comprising a pair of concentrically arranged hollow cylinders defining a passageway therebetween for refrigerant for refrigerating said container to at least partially freeze the contents, a discharge opening in said container for discharging the refrigerated contents therefrom, means comprising a centrifuge for receiving the discharged material, said centrifuge comprising a perforated wall for the discharge of liquid material and an opening in said centrifuge for the discharge of ice crystals, said centrifuge being adapted to discharge liquid and ice crystals continuously and simultaneously, and means for introducing heated air under pressure through the perforated wall of said centrifuge and into contact with the material therein.

10. Apparatus for dehydrating liquid bearing solids by subjecting the same to a series of separate freezing treatments wherein the temperature for each treatment is maintained at a lower differential to transform a portion of the water into ice crystals which are removed, said apparatus comprising a series of tanks for holding the liquid to be treated, freezing cylinder means in each tank, said freezing cylinder comprising a pair of telescoping hollow cylindrical containers connected together for receiving refrigerant, stirrer means for agitating the liquid in said tanks, a discharge opening in the bottom of each tank, and means comprising a valve operatively connected to said stirrer for closing said discharge opening, and means for opening and closing said valve.

References Cited in the file of this patent

UNITED STATES PATENTS

| 1,033,884 | Freymouth | July 30, 1912 |
| 1,633,712 | Ribi | June 28, 1927 |
| 1,954,518 | Downer | Apr. 10, 1934 |
| 1,963,842 | Gay | June 19, 1934 |
| 2,005,734 | Field | June 25, 1935 |
| 2,145,331 | Arensberg | Jan. 31, 1939 |
| 2,179,436 | Smith | Nov. 7, 1939 |
| 2,436,218 | Malcolm | Feb. 17, 1948 |
| 2,467,933 | Gruhn | Apr. 19, 1949 |
| 2,480,583 | Johnson | Aug. 30, 1949 |
| 2,552,523 | Cunningham | May 15, 1951 |
| 2,559,205 | Wenzelberger | July 3, 1951 |
| 2,614,134 | Powers | Oct. 14, 1952 |
| 2,650,479 | Kattis | Sept. 1, 1953 |
| 2,657,549 | Wenzelberger | Nov. 3, 1953 |

FOREIGN PATENTS

| 140,333 | Germany | Apr. 11, 1903 |